(12) United States Patent  
Albasheir et al.

(10) Patent No.: US 9,479,903 B2  
(45) Date of Patent: Oct. 25, 2016

(54) METHODS AND SYSTEMS FOR MONITORING MOVING UE/VEHICLE SPEED IN WIRELESS NETWORKS

(71) Applicants: Suliman Albasheir, Saint-Laurent (CA); Jad El-Najjar, Montreal (CA)

(72) Inventors: Suliman Albasheir, Saint-Laurent (CA); Jad El-Najjar, Montreal (CA)

( * ) Notice: Subject to any disclaimer, the term of this patent is extended or adjusted under 35 U.S.C. 154(b) by 0 days.

(21) Appl. No.: 14/720,754

(22) Filed: May 23, 2015

(65) Prior Publication Data

US 2015/0334531 A1   Nov. 19, 2015

(51) Int. Cl.
*H04W 24/00* (2009.01)
*H04W 4/02* (2009.01)
*H04W 4/12* (2009.01)
*G08G 1/01* (2006.01)

(52) U.S. Cl.
CPC ........... *H04W 4/027* (2013.01); *G08G 1/0104* (2013.01); *H04W 4/12* (2013.01)

(58) Field of Classification Search
CPC ............... H04W 64/00; H04W 8/245; H04M 1/72519; G08G 1/0104
USPC .................... 455/456.1, 418, 550.1; 701/119
See application file for complete search history.

(56) References Cited

U.S. PATENT DOCUMENTS

| | | | | |
|---|---|---|---|---|
| 6,985,827 B2* | 1/2006 | Williams | ............... | G08G 1/054 700/159 |
| 2004/0186663 A1* | 9/2004 | Irie | ........................ | G01C 21/36 701/431 |
| 2011/0010042 A1* | 1/2011 | Boulet | .................... | G08G 1/052 701/31.4 |
| 2011/0059754 A1* | 3/2011 | Cai | ...................... | H04W 64/006 455/456.3 |
| 2013/0317730 A1* | 11/2013 | Van Laethem | .. | G08G 1/096716 701/119 |
| 2014/0055259 A1* | 2/2014 | Otani | ........................ | B60Q 1/54 340/466 |
| 2014/0210407 A1* | 7/2014 | Won | ........................ | H02J 7/025 320/108 |
| 2014/0232561 A1* | 8/2014 | Musachio | ................ | G08G 1/08 340/932 |
| 2015/0213656 A1* | 7/2015 | Stacy | ........................ | G07C 5/08 701/31.5 |
| 2016/0027290 A1* | 1/2016 | English | .............. | H04N 5/23203 340/539.13 |

* cited by examiner

*Primary Examiner* — Danh Le

(57) ABSTRACT

A network node in a mobile network monitors vehicle speed based on the registered User Equipments (UEs)/Vehicles. The network node receives information of the moving UE/Vehicle from other network nodes in the mobile network, and determines the corresponding UE/Vehicle moving speed information based on the collected information. For each UE/Vehicle, the network node creates a speed information record indicating the UE/Vehicle moving speed information. The network node then transmits the speed information record to other messaging nodes in order to (i) send warning message to the moving UE/Vehicle when the speed is about to exceed or has exceeded the speed limit, and (ii) to deliver the speed information record to the responsible/ticketing authorities/entities when the moving UE/Vehicle has violated the speed limitation in a certain area.

27 Claims, 6 Drawing Sheets

| UE | Time Stamp | Angle of Arrival | Direction of Arrival | UE Latitude | UE Longitude | Time Advance |
|---|---|---|---|---|---|---|
| UE1 | t1 | A1 | D1 | Lat1 | Long1 | TA1 |
| UE2 | t2 | A2 | D2 | Lat2 | Long2 | TA2 |
| ... | ... | ... | ... | ... | ... | ... |
| UEn | tn | An | Dn | Latn | Longn | TAn |

Speed Determination Record 600

| IMSI | IMEI | Time Stamp | Geo-road | Speed Road Limit | Moving Speed |
|---|---|---|---|---|---|
| IMSI1 | IMEI1 | t1 | Highway 1 | SRL1 | MS1 |
| IMSI2 | IMEI2 | t2 | Blvrd 2 | SRL2 | MS2 |
| ... | ... | ... | ... | ... | ... |
| IMSIn | IMEIn | tn | Street n | SRLn | MSn |

Speed Information Record 650

METHODS AND SYSTEMS FOR MONITORING MOVING UE/VEHICLE SPEED IN WIRELESS NETWORKS

TECHNICAL FIELD

Embodiments of the invention relate to UE speed monitoring in wireless communication networks.

BACKGROUND

Positioning via cell polygons and time advance, were introduced to Long Term Evolution (LTE) 4G networks as features for accurately determining the position and distance of UE for control signaling purposes and emergency Voice over LTE (VoLTE) calls. These features allow an Evolved Universal Terrestrial Radio Access Network (E-UTRAN) NodeB (abbreviated as EnodeB) in an LTE network to automatically be aware of its User Equipment (UE)s positions in its coverage area, and be able to accurately identify and forward positioning information to its neighboring EnodeB when handovers, tracking area updates and cell reselections occur. Positioning and time advance allow an EnodeB to obtain accurate location of its UEs and to forward such information to its neighboring EnodeB cells when mobility takes place. Moreover, these features enable the EnodeB to associate and identify the power and time synchronization of the Radio Frequency (RF) signals that are needed to propagate to its particular UEs for reduced interference and block error rate.

In a conventional handover scheme, a UE is attached to an EnodeB that provides the best RF signal quality with respect to the Signal to Interference plus Noise Ratio (SINR). A source EnodeB will allow its attached UE to handover to its neighboring target EnodeB when the SINR of the neighboring EnodeB becomes higher than that of the source EnodeB. Source and target Enodebs will be aware of the UE geographical location, as it transits from the source EnodeB cell polygon to the target EnodeB cell polygon. Timing Advance will also provide the distance of the UE from its source Enodeb and target Enodeb respectively before and after handover. In addition, when performing handover or cell reselection, a UE if idle, e.g. sleeping mode, will become connected for the amount time needed to transfer control and data bearers from the source to the target EnodeB. With this vital information, and through the following embodiments, monitoring of UE speed in Wireless Networks becomes possible, essential and will provide great accuracy in a real-time fashion.

SUMMARY

According to one embodiment, a method is provided for monitoring Vehicle Speed based on the registered UE, User Equipment, in the mobile network The method comprises: receiving speed determination record of the moving UE from other network nodes in the mobile network; determining the corresponding UE/Vehicle (moving Speed information; creating for each UE/Vehicle, a speed information record indicating the UE/Vehicle moving speed information; and transmitting the speed information record to the messaging nodes.

According to another embodiment, a network node in a mobile network is used for monitoring Vehicle Speed based on the registered UEs, User Equipments, in the mobile network. The network node comprises a circuitry adapted to cause the network node to receive, through its receiver module, the speed determination record of the moving UE from other network nodes in the mobile network; determine, through its speed information determination module, the corresponding UE/Vehicle moving Speed information; create, through its speed information record creation module, for each UE/Vehicle, a speed information record indicating the UE/Vehicle moving speed information; and transmit, through its transmitter module, the speed information record to the messaging nodes. Wherein, for each moving UE/Vehicle, the speed information record created for the given UE/Vehicle comprises of data entries that include; IMSI/MSISDN, IMEI, geographical road, road speed limit, moving speed and time stamp.

In one embodiment, the network node circuitry comprises a processor, a memory and an interface both coupled with the processor. The memory contains instructions that, when executed, causes the processor to identify the corresponding geographical road/highway, associated with the Vehicle/UE(s), and its speed limit based on the area map and the provided UE latitude & longitude coordinates; calculate the speed of the moving UE/vehicle based on the provided speed determination record; monitor the corresponding UE/Vehicle moving Speed; determine whether the UE/vehicle moving speed exceeds the speed limit of the corresponding road/highway; and transmit the speed information record to the messaging nodes for UE/vehicle violating the speed limit regulations; wherein the transmitted record will be used as warning message for the UE/vehicle or as informative message to the responsible authorities/entities.

In another embodiment, the network node's speed information determination module further comprises: A speed calculation unit and a UE to speed association Unit, adapted respectively, to calculating the speed and associating it to the moving UE/vehicle based on the provided speed determination record and; a location determination unit, adapted to determine the UE/vehicle moving speed limit of the corresponding location road/highway; and; a speed monitoring unit adapted to monitoring the corresponding UE/Vehicle moving speed through identifying whether the UE/vehicle moving speed exceeds the speed limit of the corresponding road/highway.

According to yet another embodiment, a Radio Base Station (RBS) is provided in a communication network for providing UE speed determination record to the network node. The RBS wherein its circuitry comprises a processor, a memory and an interface both coupled with the processor, the memory containing instructions that when executed cause the processor to collect UE information from the signaling exchange between the registered user equipment, UE, and the corresponding RBS node; to determine subset of the speed determination record, the timing advance and the angle/direction of arrival, time stamp, and UE latitude & longitude coordinates; and; to transmit subset of the speed determination record, the timing advance and the angle/direction of arrival, time stamp, and UE latitude & longitude coordinates to the network node.

According to one embodiment, a method is performed by Radio Base Station (RBS), in a mobile communication network. The method comprises: collecting UE information from the signaling exchange between the registered user equipment, UE, and the corresponding RBS node; and determining, subset of the speed determination record, the timing advance and the angle/direction of arrival, time stamp, and UE latitude & longitude coordinates; and transmitting subset of the speed determination record, the timing advance and the angle/direction of arrival, time stamp, and UE latitude & longitude coordinates to the network node.

Wherein determining the UE/vehicle latitude & longitude further comprises of specifying the UE/vehicle location through cell vertices, which form a polygon, where each vertex is defined by latitude & longitude coordinates. Wherein the speed determination record includes one or more data entries that comprise: time stamp, UE latitude & longitude coordinates, angle/direction of arrival, timing advanced, and the UE reference. Wherein the mobile network is radio access and core network for LTE/LTE-A network and the RBSs are EnodeBs in the LTE network.

According yet to another embodiment, a Radio Base Station (RBS) in a mobile network comprises a radio network interface adapted to collect UE information from the signaling exchange between the registered user equipment, UE, and the corresponding RBS node; a UE information determination module adapted to determine, subset of the speed determination record, the timing advance and the angle/direction of arrival, time stamp, and UE latitude & longitude coordinates; and; a network interface adapted to transmit subset of the speed determination record, the timing advance and the angle/direction of arrival, time stamp, and UE latitude & longitude coordinates to the network node.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
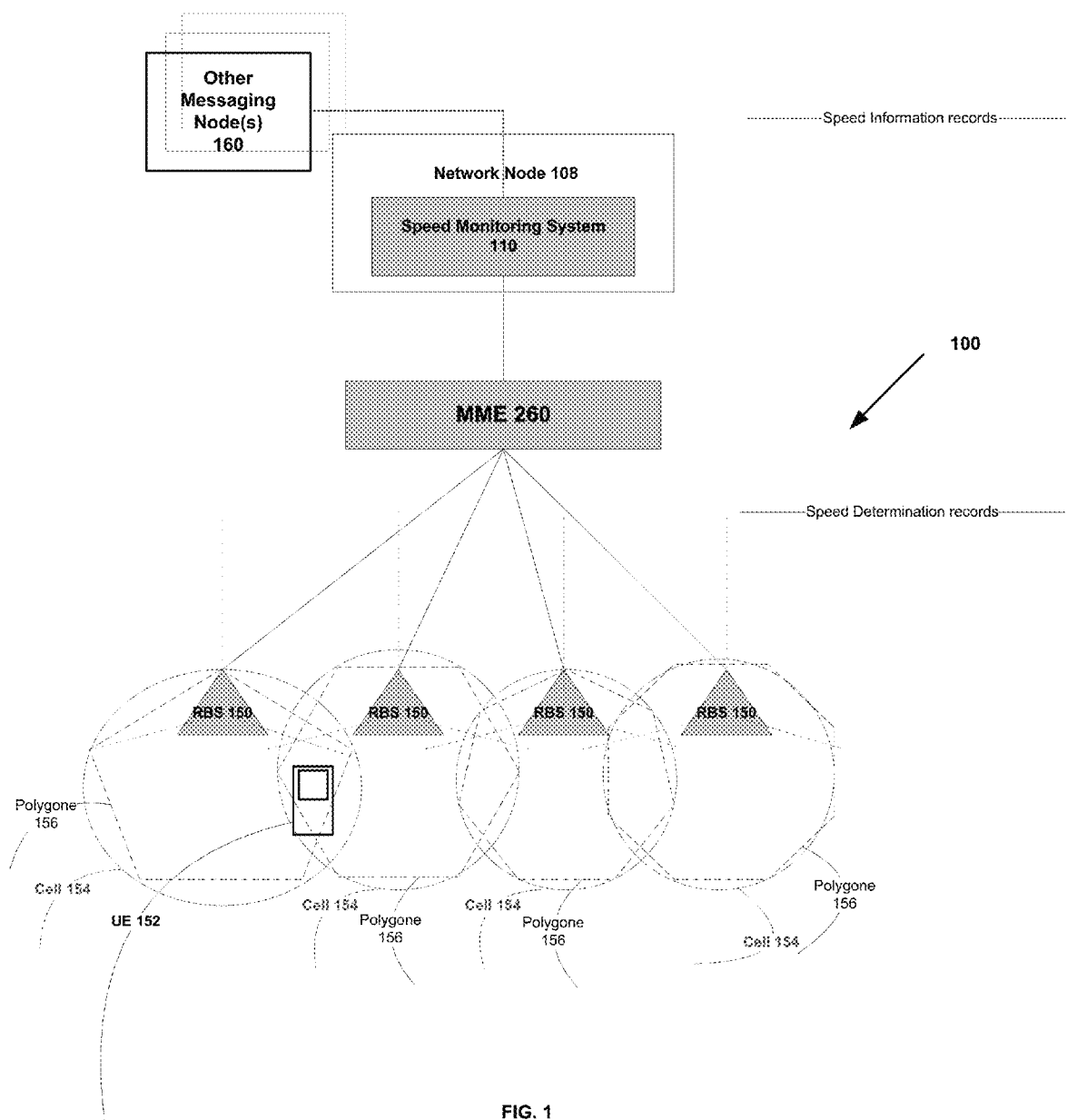
FIG. 1 illustrates a communication network according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a speed monitoring system that uses speed determination records collected from a RBS or other network nodes to create speed information record for each moving User Equipment UE in the network. The speed monitoring system transmits the speed information record to "Other messaging nodes" for two reasons; (i) send warning message to the moving UE when the speed is about to exceed or has exceeded the speed limit, and/or (ii) to deliver the speed information record to the responsible/ticketing authorities/entities when the moving UE has violated the speed limitation in a certain area, e.g., highway. According to the embodiments of the invention, the speed information records are generated dynamically and intelligently, taking into account ongoing moving UE activities, e.g., end-to-end traffic sessions in the network, handovers, tracking area updates and cell reselections. The end-to-end traffic sessions, handovers, tracking area updates and cell reselections provide information (e.g., cell polygons, direction/angle of arrival, timing advance . . . ) not only for the connections to/from an RBS, but also the paths throughout and information (e.g., IMSIs . . . ) of the mobile network. For each moving UE, the speed monitoring system generates a speed information record indicating the IMSI/IMEI, the speed of the moving UE, the time of the happening, i.e., time stamp, and the speed limitation of the geographical area where the UE is located. The term "speed monitoring system" refers to the group of modules that are running on the network node or MME and that are executed together in a particular sequence to generate and to transmit a speed information record, given speed determination records received as input. In one embodiment, the speed monitoring system includes, but is not limited to, a receiver module, a speed information determination module, a speed information record creation module and a transmitter module. In one embodiment, the speed monitoring system, located in the MME or network node, performs the following method comprising: Receiving speed determination record of the moving UE from other network nodes in the mobile network; Determining the corresponding moving UE/Vehicle moving Speed information; Creating for each UE/Vehicle, a speed information record indicating the UE/Vehicle moving speed information; and Transmitting the speed information record to the messaging nodes.

In one embodiment, the speed determination record includes a UE and time stamp indicator to indicate respectively the UE and time associated to the record. In addition, the speed determination record contains the angle/direction of arrival, the time advance and the latitude and longitude of the UE to which this record is associated. The angle/direction of arrival together with the time advance information and time stamp will help identifying the speed of the moving UE. The UE latitude and UE longitude will help to locate the UE in an area map and hence identify its speed limitation on a particular road. The UE latitude and longitude are collected from the RBS's source cell polygon, where the UE is attached, and or the target cell polygon, where the UE is moving towards after handing over (or cell reselection if in idle mode) from the source cell. For example, in a speed determination record, the time stamp indicator and UE indicator may be per vehicle or UE, and two or more speed determination record could be associated to the same vehicle or UE but at different time stamps.

In one embodiment, the speed information record includes the IMSI/IMEI of the moving UE and or vehicle, the time stamp, the geographical road, the road speed limit and the moving speed of the UE/vehicle. The speed information record is transmitted to the other messaging nodes for two reasons: (i) send warning message to the moving UE when the speed is about to exceed or has exceeded the speed limit, and/or (ii) to deliver the speed information record to the responsible/ticketing authorities/entities when the moving UE has violated the speed limitation in a certain area, e.g., highway. The speed information records may be sent to the other messaging nodes periodically/dynamically for continuous speed monitoring of all moving UEs/vehicles.

In one embodiment, to create a moving UE speed information record, two or more moving UE speed determination records associated to that same UE are needed. From two speed determination records associated to the same moving UE, the different time stamps are used, along with the time advance and the angle/direction of arrivals information to determine the speed of the moving UE/vehicle. For that matter, from the first speed determination record: the Time Advance will identify the distance (d1) of the moving UE from the RBS; the angle/direction of arrival will identify the moving UE angle (alpha1) from the RBS and the time stamp (t1) will be tagged to the first position of the UE. Similarly the second speed determination record will identify (d2), (alpha2) and (t2) tagged to the second position of that UE. From the Al-Kashi mathematical Theorem's also know as generalised Pythagore's Theorem and or Cosinus Law, the distance completed (dc12) between the first and the second speed determination record is equal: $[(dc12)^2=(d1)^2+(d2)^2-2*d1*d2*cos(-alpha1+alpha2)]$; and finally the speed (s12) of the moving UE will be equal: $[s12=dc12/(|t2-t1|)]$. The geographical location is determined by UE latitude and UE longitude of the two speed determination records, which will identify the road/highway on which the UE is moving and hence the speed limitation associated to this road/highway. Given the calculated moving speed, the geographical location, the road speed limitation, the time stamps and the UE IMSI/IMEI, the speed information record is created.

FIG. 1 is a block diagram illustrating a communication network 100 that provides a dynamic, intelligent speed information record creation technique according to one embodiment. For simplicity, only part of the network 100 is shown. Examples of the network 100 include, but are not limited to, an LTE network, a Wideband Code Division Multiple Access (WCDMA) network, and any mobile networks that use radio base stations to provide wireless RF access to mobile users/devices. In the following description, the terms "communication network" and "mobile network" are used interchangeably.

The network 100 includes a plurality of RBSs 150, each providing wireless service coverage to a cell 154 to which a polygon 156 is associated. In one embodiment, the network 100 is a heterogeneous network in which the RBSs 150 have different capacities, different service quality, and/or may be located in different environments. The cells 154 may have different sizes and different number of vertices polygons; some of the cells 154 may partially or entirely overlap. Examples of the cells 154 include, but are not limited to: macrocells, microcells, picocells, femtocells, etc.

The network 100 includes a network node 108 in which a speed monitoring system 110 is located. The speed monitoring system 110 is connected, directly or indirectly to the RBSs 150, MME 260. The speed monitoring system 110 collects speed determination records of ongoing moving UEs activities in the network 100 (e.g., from the RBSs 150, MME 160), and generates speed information records for each of the UEs 152 to transmit to the other messaging nodes 160. FIG. 1 shows the collection of the speed determination records by the speed monitoring system 110 (shown as solid lines from RBS 150 to MME 160 to speed monitoring system 110). FIG. 1 shows also the transmission, from the speed monitoring system 110, of the speed information records to the other messaging nodes 160 (shown as dotted lines from the speed monitoring system 110 to the other messaging nodes 160). In one embodiment, the speed monitoring system 110 periodically receives the speed determination records, associated to the moving UEs 152 in the network 100, from the MME 160 or RBSs 150. Moreover, the speed monitoring system 110 periodically transmits the speed information records to the other messaging nodes 160. The RBSs, in turn, periodically transmit the speed determination records to the MME 160 or speed monitoring system 110. Speed determination records are determined by the RBSs 150 based upon their attached moving UEs 152 activities. Examples of the UEs 152 include, but are not limited to, vehicles, mobile phones and other portable communication devices.

The speed information records are provided to the other messaging nodes for two reasons; (i) send warning message to the moving UE when the speed is about to exceed or has exceeded the speed limit, and/or (ii) to deliver the speed information record to the responsible/ticketing authorities/entities when the moving UE has violated the speed limitation in a certain area, e.g., highway. The technique for creating a speed information record will be described in detail later with reference to FIGS. 3 and 4. The technique of determining a speed determination record will be described in details in FIG. 5.

Figure 2:
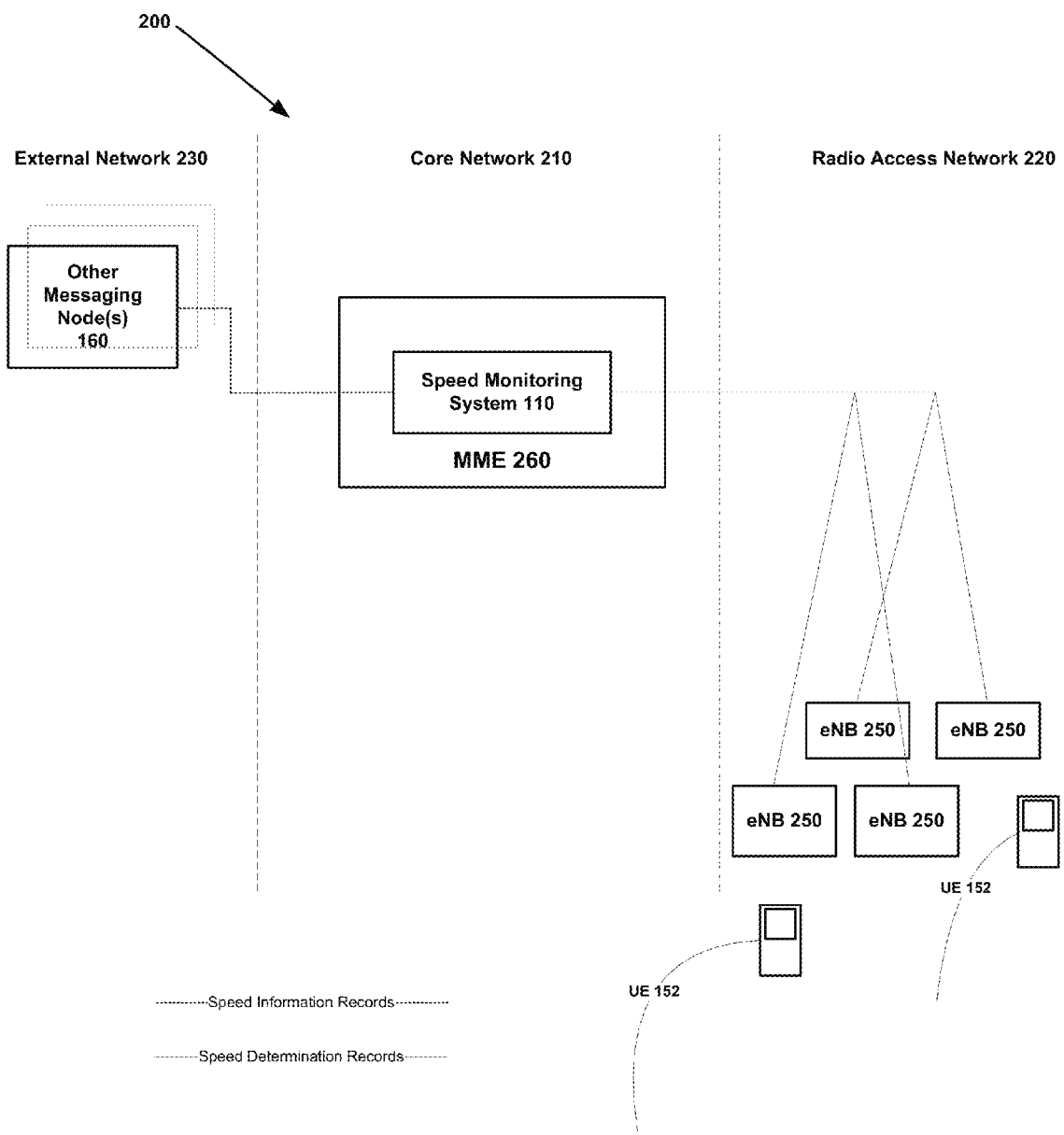
FIG. 2 illustrates an LTE network according to one embodiment.

FIG. 2 is a block diagram illustrating an LTE network 200 according to one embodiment. Speed determination records are shown in solid lines, and speed information records are shown in dotted lines. For simplicity, not all the network elements are shown in FIG. 2.

The LTE network 200 includes an external network 230, a core network 210 and a Radio Access Network (RAN) 220. The core network 210 includes the speed monitoring system 110 and the MME 260. In one embodiment, the speed monitoring system 110 described in connection with FIG. 1 is part of the MME 260. In alternative embodiments, the speed monitoring system 110 may be a standalone network node or co-located with some other network nodes (e.g., MME 260) in FIG. 2.

The RAN 220 includes multiple EnodeBs also referred as eNBs 250, each of which corresponding to one of the RBSs 150 in FIG. 1. The EnodeB 250 is the hardware that communicates directly with the UEs. In one embodiment, the speed monitoring system 110 periodically receives the speed determination records associated to the moving UEs 152 in the network 200, from the EnodeBs 250. The speed monitoring system 110, in turn, periodically creates and transmits the speed information records to the external network 230, based on the speed determination records received from the EnodeB 250. Moving UEs may perform handovers, cell reselection and tracking area updates which causes the source and target EnodeBs 250 to send speed determination records to the speed monitoring system 110.

The external network 230 includes the other messaging nodes 160 which receive speed information records from the speed monitoring system 110 for two reasons; (i) send warning message to the moving UE when the speed is about to exceed or has exceeded the speed limit, and/or (ii) to deliver the speed information record to the responsible/ticketing authorities/entities when the moving UE has violated the speed limitation in a certain area, e.g., highway. The, other messaging nodes 160, transmissions of the warning message to the UEs 152, are done based on the IMSI/IMEI information contained in the speed information record.

Figure 3:
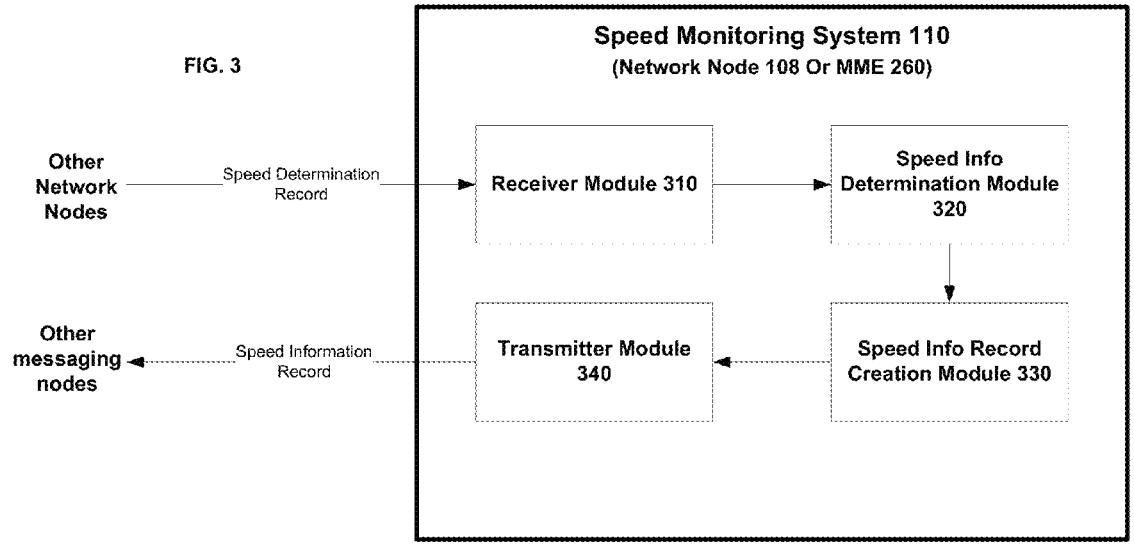
FIG. 3 illustrates a block diagram of a speed monitoring system in a network node for creating speed information records according to one embodiment.

FIG. 3 illustrates a block diagram of the speed monitoring system 110 according to one embodiment. As described before, in some embodiments, the speed monitoring system 110 may be part of the network node 108 of FIG. 1, or the MME 260 of FIG. 2.

In one embodiment, the speed monitoring system 110 includes a receiver module 310 adapted or operative to collect the speed determination records; a speed information determination module 320 adapted or operative to determine the corresponding UE/Vehicle moving Speed information and location; a speed information record creation module 330 adapted or operative to create, for each UE/Vehicle, a speed information record indicating the UE/Vehicle moving speed information and speed limitation; and a transmitter module 340 adapted or operative to transmit the speed information record to the other messaging nodes, when the moving UE speed is about to exceed or has exceeded the speed limit. Wherein the speed information record creation module (330) obtains all the necessary information as input from the speed information determination module (320), in order to create the speed information record.

Figure 4:
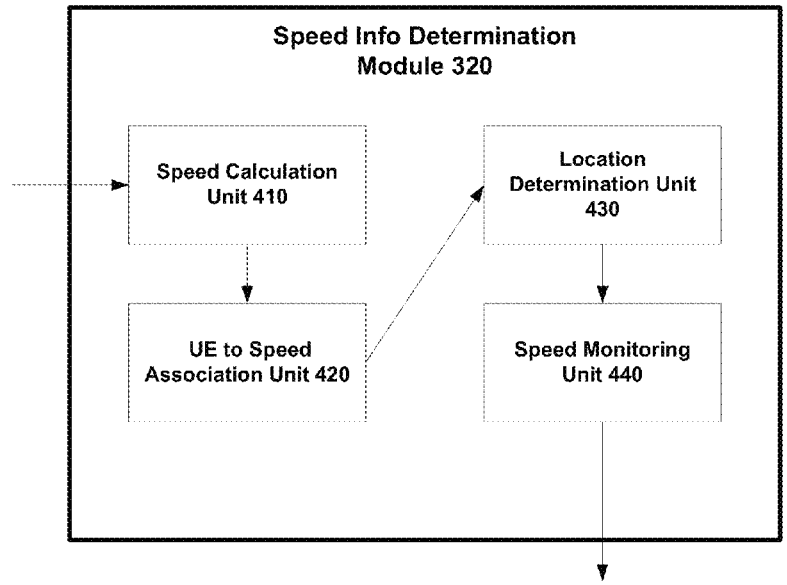
FIG. 4 illustrates a block diagram of a speed information determination module in the speed monitoring system according to one embodiment.

FIG. 4 illustrates a block diagram of the speed information determination module 320 according to one embodiment. In alternative embodiments, the speed information determination module 320 may include additional or alternative units. In one embodiment, each unit in FIG. 4 is hardware or a combination of hardware and software; in alternative embodiments, each unit in FIG. 4 represents functions executed by a processor, e.g., the processor 920 of FIG. 9. In this embodiment, the speed information determination module 320 includes a speed calculation unit (410) and a UE to speed association Unit (420), adapted respectively, to calculating the speed and associating it to the moving UE/vehicle (152) based on the provided speed determination records. The speed information determination module 320 also includes a location determination unit (430), adapted to determine the UE/vehicle (152) moving speed limit of the corresponding location road/highway; the calculated moving UE speed, the location determination become part of the speed information record to be transmitted to the other messaging nodes. The location determination unit (430) maps the speed limitation (based on the determined geo-location) which becomes part of the speed information record.

In one embodiment, the speed information determination module 320 also includes a speed monitoring unit (440) adapted to monitor the corresponding UE/Vehicle moving Speed through identifying whether the UE/vehicle moving speed exceeds the speed limit of the corresponding road/highway. Thus, the speed information record may indicate that a particular moving UE has violated the speed limitation, which will be transmitted to the other messaging nodes; wherein the transmitted speed information record will be used as warning message for the UE/vehicle or as informative message to the responsible authorities/entities.

In one embodiment, the speed information determination module 320 also performs one or more of the following tasks: identify two or more speed determination records associated with a particular moving UE or vehicle; calculate the UE moving speed (in the speed calculation unit (410)) based on Al-Kashi's Theorem described previously, by retrieving the Timing Advance entries, the time stamps and the angle/direction of arrivals entries from the speed information records associated to the same moving UE or vehicle.

Figures 5, 6:
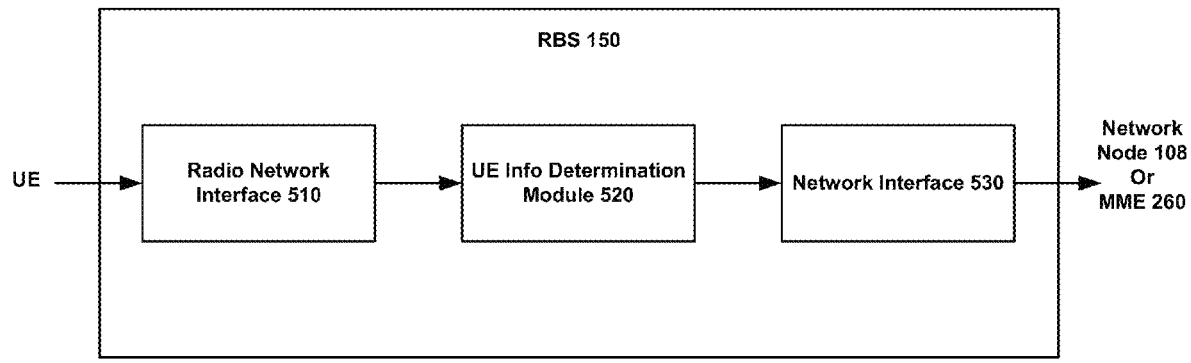
FIG. 5 illustrates a block diagram of a RBS according to one embodiment.
FIG. 6 illustrates an example of a speed determination record and an example of a speed information record according to one embodiment.

FIG. 5 illustrates a block diagram of a RBS (e.g., the RBS 150 of FIG. 1 or the eNB 250 of FIG. 2) according to one embodiment. In one embodiment, the RBS 150 includes a radio network interface (510) adapted to collect UE information from the signaling exchange between the registered user equipment, UE, (152), and the corresponding RBS node (150); a UE information determination module (520) adapted to determine, subset of the speed determination record, the timing advance and the angle/direction of arrival, time stamp, and UE latitude & longitude coordinates; and a network interface (530) adapted to transmit subset of the speed determination record, the timing advance and the angle/direction of arrival, time stamp, and UE latitude & longitude coordinates to the network node (108, 260, 900). In one embodiment, the source RBS may allow the UE to proceed with a cell reselection, a tracking area update and or a handover to the target RBS (determined by the source RBS), and in that case, each of both RBSs (source and target) will transmit each via their network interface (530) a speed determination record associated to UE.

FIG. 6 illustrates two examples of: the speed determination record (600), (which may be an embodiment of the speed determination record transmitted by the network interface 530 in FIG. 5) and; the speed information record (650) (which may be an embodiment of the speed information record transmitted by the Transmitter module 340 of FIG. 3) according to one embodiment. The speed determination record 600, associated with one moving UE 152, has been created by the RBS 150 or eNB 250 to propagate to the speed monitoring system 110 and that will be used to determine/create the speed information record 650. The speed information record 650 is created by the speed monitoring system 110 and is transmitted to the other messaging nodes 160. Wherein, in order to create the speed information record 650 associated to a moving UE, two or more speed determination record 600 are needed, for that particular moving UE 152. In this example of the speed determination record 600, each row contains the speed determination record of one of the n moving UEs or vehicles in the network (i.e., $UE_1$, $UE_2$, ..., $UE_n$). For each of the moving UEs (e.g., $UE_1$), the Time Stamp (e.g., $t_1$), the Angle of Arrival (e.g., $A_1$), the Direction of Arrival (e.g., $D_1$), the UE latitude (e.g., $Lat_1$), the UE longitude (e.g., $Long_1$) and the Time Advance (e.g., $TA_1$) are identified. In the example of the speed information record 650, each row contains the speed information record of one of the n moving UEs or vehicles in the network (i.e., $IMSI_1/IMEI_1$, $IMSI_2/IMEI_2$, ..., $IMSI_n/IMEI_n$). For each of the moving UEs or vehicles (e.g., $IMSI_1/IMEI_1$), the Time Stamp (e.g., $t_1$), the geo-location "Geo-road" (e.g., $Highway_1$), the speed road limit (e.g., $SRL_1$) and the moving speed (e.g., $MS_1$) are identified. It is understood that the speed information record 650 is calculated (by the speed information determination module 320) and created (by the speed information record creation module 330) from two or more speed determination records 600, associated to the same UE (e.g., $IMSI_1/IMEI_1$), where the latest speed determination record 600 received is key in order to identify the UE's moving speed (e.g., $MS_1$), the UE's Time Stamp (e.g., $t_1$), the UE's speed limitation (e.g., $SRL_1$) used to create the speed information record 650, as long as the UE's geo-road (e.g., same $Highway_1$) remains the same from previous speed determination records 600 associated to it. In an embodiment, the moving speed (in the speed information record 650) of a moving UE 152 or vehicle is measured by the speed information determination module 320, more precisely in its Speed Calculation Unit 410, by using two or more speed determination records 600 associated to that UE 152, received in short interval of time, and by using Al-Kashi's Theorem described previously. In yet another embodiment, the speed information record 650 may be calculated and created by two or more speed determination records 600 given that they are received in a short interval of time, belong to the same moving UE and where the UE's geo-road has not changed.

In one embodiment, the selections of the speed determination records 600 used to identify and create the speed information record 650, is dependent on the time interval of receiving the speed determination records 600 and on the information contained in the speed determination records. For each speed determination record 600 received, the speed information determination module 320 may use it or stock it in the memory for latter usage. The speed information determination module 320 uses and associates intelligently and dynamically between the speed determination records 600 in order to determine and calculate the fields (e.g., Moving speed) used to create the speed information record 650 that will be transmitted by the Transmitter Module 340 (of the speed monitoring system 110) to the other messaging nodes 160 for two reasons; (i) send warning message to the moving UE when the speed is about to exceed or has exceeded the speed limit, and/or (ii) to deliver the speed information record to the responsible/ticketing authorities/entities when the moving UE has violated the speed limitation in a certain area, e.g., highway.

Figure 7:
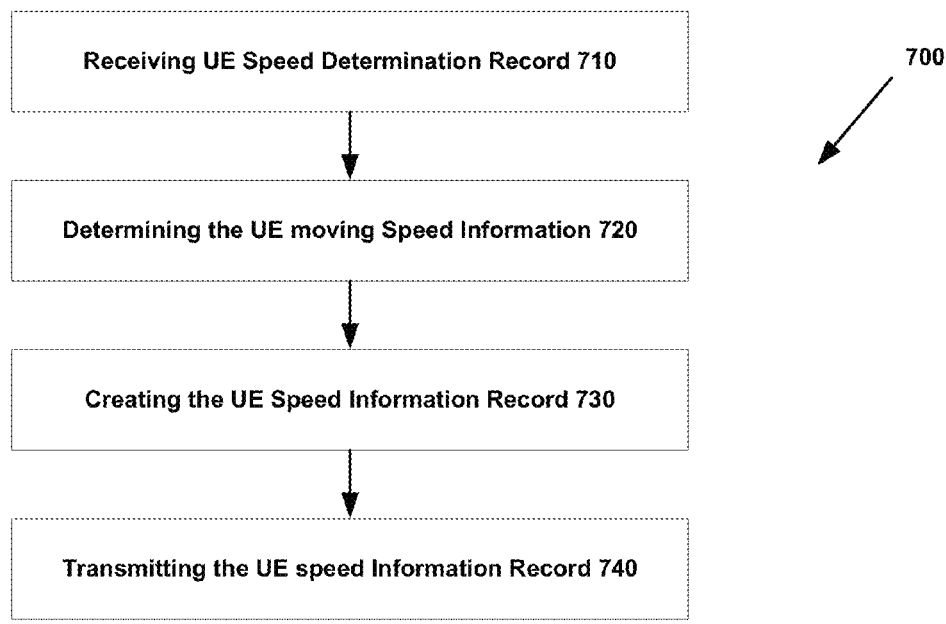
FIG. 7 is a flow diagram illustrating a method of a network node for providing speed information records to other messaging nodes according to one embodiment.

FIG. 7 illustrates a method 700 for monitoring Vehicle Speed based on the registered UE. The method 700 is performed by a network node in a mobile network, such as the network node 108 of FIG. 1, MME 260 of FIG. 2 or the speed monitoring system 110 of FIG. 3. The method 700 may be performed by hardware (e.g., circuitry, dedicated logic, programmable logic, microcode, etc.), or a combination of hardware and software (e.g., instructions run on a processing device).

The method 700 begins with the network node receiving speed determination record of the moving UE from other network nodes in the mobile network (block 710). For example, the network node receives the speed determination record(s) from the one or more eNB/RBS or from the MME in the mobile network. Based on the collected information, the network node determines the corresponding UE/Vehicle moving Speed information (block 720). The network node creates for each UE/Vehicle, a speed information record indicating the UE/Vehicle moving speed information (block 730). The network node then transmits the speed information record to the messaging nodes (block 740). For example, the speed information record created for the given UE/Vehicle comprises of data entries that include; IMSI/MSISDN, IMEI, geographical road, road speed limit, moving speed and time stamp.

Figure 8:
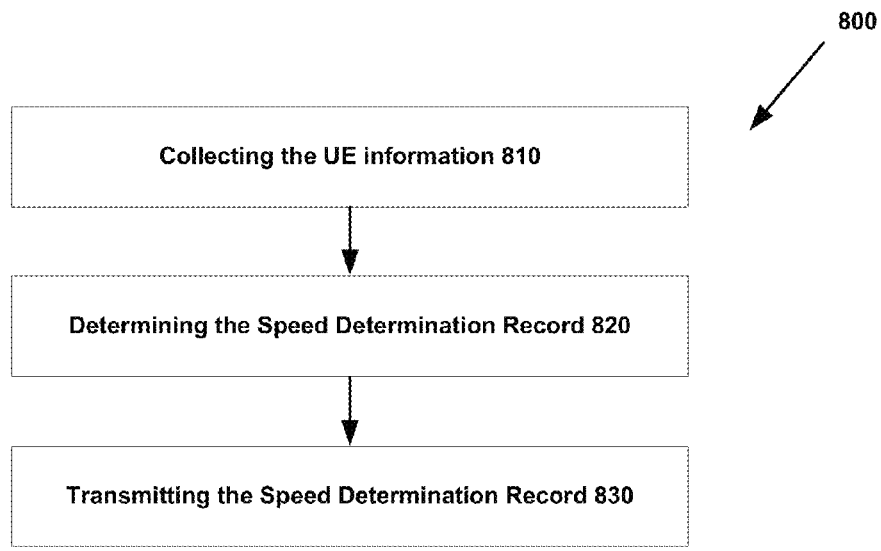
FIG. 8 is a flow diagram illustrating a method of a RBS according to one embodiment.

FIG. 8 illustrates a method 800 of a RBS/eNB (e.g., the RBS 150 of FIG. 1 and eNB 250 of FIG. 2) in a mobile network according to one embodiment. The method 800 may be performed by hardware (e.g., circuitry, dedicated logic, programmable logic, microcode, etc.), or a combination of software (e.g., instructions run on a processing device).

The method 800 begins with the RBS collecting UE information from the signaling exchange between the registered UE and the corresponding RBS node (block 810). Based on the received UE information, the RBS determines subset of the speed determination record (block 820). The RBS then transmits subset of the speed determination record to the network node (block 830). For example, the speed information record created for the given UE/Vehicle comprises of data entries that include; UE reference, time stamp, UE latitude & longitude coordinates, angle/direction of arrival and timing advanced.

Figure 9:
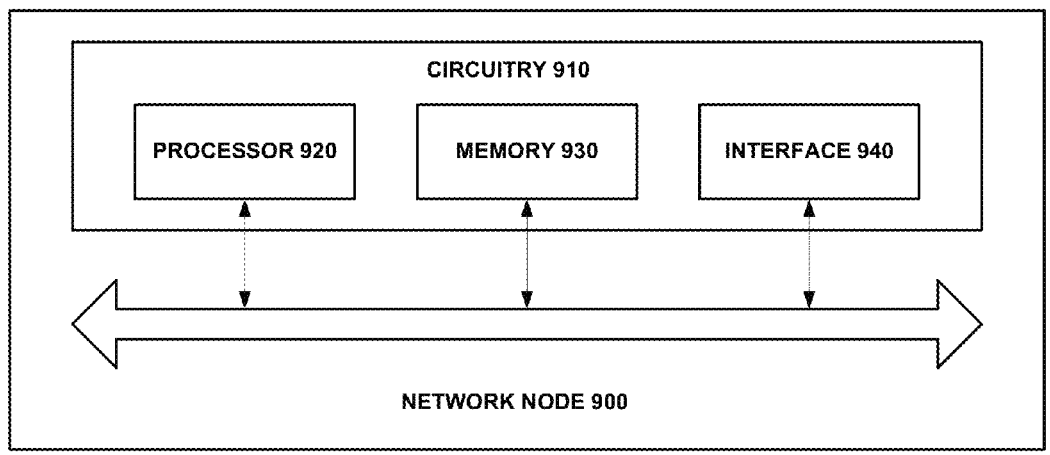
FIG. 9 illustrates a block diagram of a network node according to one embodiment.

FIG. 9 illustrates a network node 900 in a mobile network for monitoring Vehicle Speed based on the registered UE according to one embodiment. The network node 900 includes circuitry 910 adapted or operative to cause the network node 900 to perform the method 700. In one embodiment, the circuitry 910 includes a processor 920, a memory 930 and an interface 940. Both the memory 930 and the interface 940 are coupled with the processor 920. The memory 930 contains instructions that when executed cause the processor 920 to perform the method 700. The processor 920 may include one or more general-purpose processing units and/or one or more special-purpose processing units, each of which can be: a microprocessor, a central processing unit (CPU), a multi-core processing unit, an application specific integrated circuit (ASIC), a field programmable gate array (FPGA), a digital signal processor (DSP), a network processor, etc. The memory 930 may include a main memory (e.g., read-only memory (ROM), flash memory, dynamic random access memory (DRAM), etc.), a secondary memory (e.g., a magnetic data storage device, an optical magnetic data storage device, etc.), and different forms of ROMs, different forms of random access memories (RAMs), static RAMs (SRAMs), or any type of media suitable for storing instructions.

Figure 10:
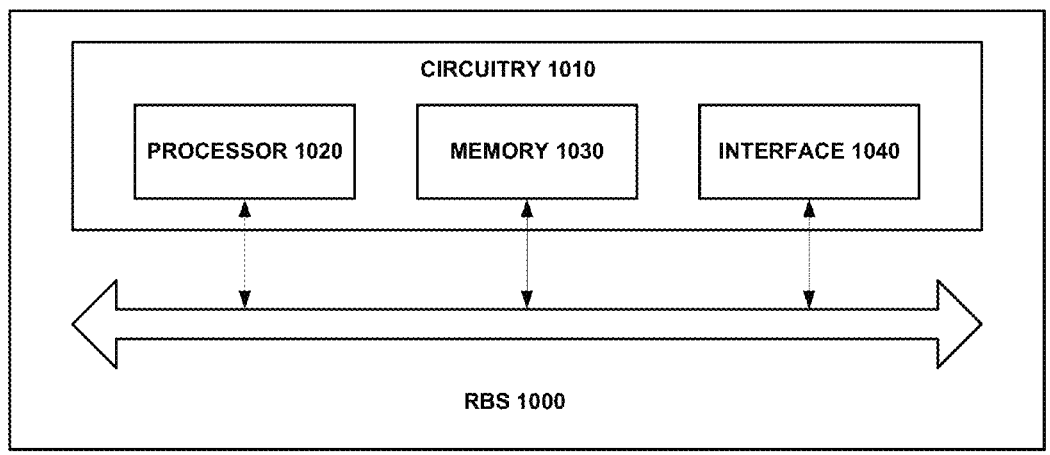
FIG. 10 illustrates a block diagram of a RBS according to another embodiment.

FIG. 10 illustrates a RBS 1000 in a mobile network according to one embodiment. The RBS 1000 includes circuitry 1010 adapted or operative to cause the RBS 1000 to perform the method 800. In one embodiment, the circuitry 1010 includes a processor 1020, a memory 1030 and an interface 1040. Both the memory 1030 and the interface 1040 are coupled with the processor 1020. The memory 1030 contains instructions that when executed cause the processor 1020 to perform the method 800. The processor 1020 may include one or more general-purpose processing units and/or one or more special-purpose processing units, each of which can be: a microprocessor, a CPU, a multi-core processing unit, an ASIC, a FPGA, a DSP, a network processor, etc. The memory 1030 may include a main memory (e.g., ROM), flash memory, DRAM, etc.), a secondary memory (e.g., a magnetic data storage device, an optical magnetic data storage device, etc.), and different forms of ROMs, different forms of RAMs, SRAMs, or any type of media suitable for storing instructions.

The operations of the flow diagrams of FIGS. 7 and 8 have been described with reference to the exemplary embodiments of FIGS. 3, 5, 9 and 10. However, it should be understood that the operations of the flow diagrams of FIGS. 7 and 8 can be performed by embodiments of the invention other than those discussed with reference to FIGS. 3, 5, 9 and 10, and the embodiments discussed with reference to FIGS. 3, 5, 9 and 10 can perform operations different than those discussed with reference to the flow diagrams. While the flow diagrams of FIGS. 7 and 8 show a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Accordingly, the specification and drawings are to be regarded in an illustrative sense rather than a restrictive sense.

What is claimed:

1. A method performed by a network node in a mobile network for monitoring vehicle speed based on registered user equipments (UEs), in the mobile network, the method comprising:
   receiving a speed determination record of a moving UE from other network nodes in the mobile network;
   determining a corresponding UE/vehicle moving speed information;
   calculating a speed of the moving UE/vehicle based on the provided speed determination record;
   associating the calculated speed with the moving UE/vehicle;
   determining a corresponding location road/highway and its speed limit;
   monitoring the corresponding UE/vehicle moving speed to specify whether the UE/vehicle moving speed exceeds the speed limit of the corresponding road/highway;
   creating for each UE/vehicle, a speed information record indicating the UE/vehicle moving information; and
   transmitting the speed information record to other messaging nodes.

2. The method of claim 1, wherein the received speed determination record comprises: UE reference, time stamp, UE latitude & longitude coordinates, angle/direction of arrival and timing advanced.

3. The method of claim 1, wherein, for each moving UE/vehicle, the speed information record created for the given UE/vehicle comprises of data entries that include: IMSI/MSISDN, IMEI, geographical road, road speed limit, moving speed and time stamp.

4. The method of claim 1, wherein creating the speed information record further comprises: identifying the corresponding geographical road/highway, associated with the Vehicle/UE, and its speed limit based on the area map and the provided UE latitude & longitude coordinates.

5. The method of claim 1, wherein transmitting the speed information record to other messaging nodes further comprising:
   sending a warning message to the moving UE/vehicle when the speed is about to exceed or has exceeded the speed limit; and
   delivering the speed information record to a responsible/ticketing authorities/entities when the moving UE/vehicle has violated the speed limitation in a certain area.

6. The method of claim 1, wherein monitoring the corresponding UE/vehicle moving Speed requires receiving several instances of the speed determination record at different time stamps.

7. The method of claim 1, wherein an UE/vehicle radio connection is corresponding with a vehicle IMSI/MSISDN registered with a SIM card for that vehicle or associated with the IMSI/MSISDN of the UE for that driver/passenger(s).

8. The method of claim 1, wherein the mobile network is radio access network & core network for LTE/LTE-A network and the RBSs are EnodeBs in the LTE network.

9. The method of claim 8, wherein the mobile network is radio access network for LTE/LTE-A network and the RBSs are EnodeBs in the LTE network.

10. A method performed by Radio Base Station (RBS) in a mobile network the method comprising:
    collecting UE information from a signaling exchange between a registered user equipment (UE) and a corresponding RBS node;
    determining, a subset of a speed determination record, a timing advance, an angle/direction of arrival, a time stamp, and an UE latitude and longitude coordinates;
    transmitting, the subset of the speed determination record, the timing advance, the angle/direction of arrival, the time stamp, and the UE latitude and longitude coordinates to a network node;
    operating a radio network interface adapted to collect UE information from the signaling exchange between the registered UE and the corresponding RBS node;
    controlling an UE information determination module adapted to determine the subset of the speed determination record, the timing advance, the angle/direction of arrival, the time stamp, and the UE latitude and longitude coordinates; and
    operating a network interface adapted to transmit the subset of the speed determination record, the timing advance, the angle/direction of arrival, the time stamp, and the UE latitude and longitude coordinates to the network node.

11. The method of claim 10, wherein determining the UE/vehicle latitude & longitude further comprises:
    Specifying the UE/vehicle location through cell vertices, which form a polygon, where each vertex is defined by latitude & longitude coordinates.

12. The method of claim 10, wherein the speed determination record includes one or more data entries that comprises: UE reference, time stamp, UE latitude & longitude coordinates, angle/direction of arrival and timing advanced.

13. A network node in a mobile network for monitoring vehicle speed based on registered user equipments (UEs) in the mobile network the network node comprising:
    a circuitry adapted to cause the network node to:
        receive a speed determination record of a moving UE from other network nodes in the mobile network;
        determine a corresponding UE/vehicle moving speed information;
        calculate a speed of the moving UE/vehicle based on the provided speed determination record;
        associate the calculated speed with the moving UE/vehicle;
        determine a corresponding location road/highway and its speed limit;
        monitor the corresponding UE/vehicle moving speed to specify whether the UE/vehicle moving speed exceeds the speed limit of the corresponding road/highway;
        create, for each UE/vehicle, a speed information record indicating the UE/vehicle moving speed information; and
        transmit the speed information record to other messaging nodes.

14. The network node of claim 13, wherein the circuitry comprises a processor, a memory and an interface both coupled with the processor, the memory containing instructions that when executed cause the processor to:
    Receive speed determination record of the moving UE from other network nodes in the mobile network;
    Determine the corresponding UE/vehicle moving Speed information;

Create for each UE/vehicle, a speed information record indicating the UE/Vehicle moving speed information; and;

Transmit the speed information record to other messaging nodes.

15. The network node of claim 13, wherein the received speed determination record comprises: time stamp, UE latitude & longitude coordinates, angle/direction of arrival, timing advanced, IMSI and IMEI.

16. The network node of claim 13, wherein, for each moving UE/vehicle, the speed information record created for the given UE/vehicle comprises of data entries that include; IMSI/MSISDN, IMEI, geographical road, road speed limit, moving speed and time stamp.

17. The network node of claim 13, wherein the memory contains instructions that when executed further cause the processor to: identify the corresponding geographical road/highway, associated with the Vehicle/UE, and its speed limit based on the area map and the provided UE latitude & longitude coordinates.

18. The network node of claim 13, wherein transmitting the speed information record to other messaging nodes, wherein a memory and an interface both coupled with a processor the memory containing instructions that when executed further cause the processor and interface to:
send a warning message to the moving UE/vehicle when the speed is about to exceed or has exceeded the speed limit; and
deliver the speed information record to a responsible/ticketing authorities/entities when the moving UE/vehicle has violated the speed limitation in a certain area.

19. The network node of claim 13, wherein monitoring the corresponding UE/vehicle moving speed, wherein the memory and an interface both coupled with the processor, the memory containing instructions that when executed further cause the processor and the interface to receive several instances of the speed determination record at different time stamps.

20. The network node of claim 13, wherein an UE/vehicle radio connection is corresponding with a vehicle IMSI/MSISDN registered with a SIM card for that vehicle or associated with the IMSI/MSISDN of the UE for that driver/passenger(s).

21. The network node of claim 13, wherein the mobile network is radio access network & core network for LTE/LTE-A network and the RBSs are EnodeBs in the LTE network.

22. The network node of claim 13, wherein the network node further comprising:
a receiver module adapted to receive speed determination record of the moving UE from other network nodes in the mobile network;
a speed information determination module adapted to determine the corresponding UE/Vehicle moving Speed information;
a speed information record creation module adapted to create for each UE/Vehicle, a speed information record indicating the UE/Vehicle moving speed information; and;
a transmitter module adapted to transmit the speed information record to other messaging nodes.

23. A Radio Base Station (RBS) in a mobile network, the RBS comprising:
a circuitry adapted to cause the RBS to:
collect UE information from a signaling exchange between a registered user equipment (UE) and a corresponding RBS node;
determine, a subset of a speed determination record, a timing advance, and an angle/direction of arrival, a time stamp, and an UE latitude and longitude coordinates;
transmit the subset of the speed determination record, the timing advance, the angle/direction of arrival, the time stamp, and the UE latitude and longitude coordinates to a network node;
a radio network interface adapted to collect UE information from the signaling exchange between the registered (UE) and the corresponding RBS node;
an UE information determination module adapted to determine; subset of the speed determination record, the timing advance, the angle/direction of arrival, the time stamp, and the UE latitude and longitude coordinates; and
a network interface adapted to transmit subset of the speed determination record, the timing advance, the angle/direction of arrival, the time stamp, and the UE latitude and longitude coordinates to the network node.

24. The RBS of claim 23, wherein the circuitry comprises a processor, a memory and an interface both coupled with the processor, the memory containing instructions that when executed cause the processor to:
Collect UE information from the signaling exchange between the registered user equipment, UE, and the corresponding RBS node;
Determine, subset of the speed determination record, the timing advance and the angle/direction of arrival, time stamp, and UE latitude & longitude coordinates; and;
Transmit subset of the speed determination record, the timing advance and the angle/direction of arrival, time stamp, and UE latitude & longitude coordinates to the network node.

25. The RBS of claim 23, wherein determining the UE/vehicle latitude & longitude, wherein the memory contains instructions that when executed further cause the processor to specify the UE/vehicle location through cell vertices, which form a polygon, where each vertex is defined by latitude & longitude coordinates.

26. The RBS of claim 23, wherein the speed determination record includes one or more data entries that comprises: time stamp, UE latitude & longitude coordinates, angle/direction of arrival, timing advanced, IMSI and IMEI.

27. The RBS of claim 23, wherein the mobile network is radio access network for LTE/LTE-A network and the RBSs are EnodeBs in the LTE network.

* * * * *